(12) United States Patent
Li et al.

(10) Patent No.: US 8,345,446 B2
(45) Date of Patent: Jan. 1, 2013

(54) FASTENING STRUCTURE FOR PORTABLE ELECTRONIC DEVICE

(75) Inventors: Zhi-Hui Li, Shenzhen (CN); Shi-Feng Wang, Shenzhen (CN); Kuan-Hung Chen, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 230 days.

(21) Appl. No.: 12/903,311

(22) Filed: Oct. 13, 2010

(65) Prior Publication Data

US 2012/0014075 A1  Jan. 19, 2012

(51) Int. Cl.
 *H05K 7/02* (2006.01)
 *H05K 7/04* (2006.01)
(52) U.S. Cl. .................... 361/807; 361/801; 361/803
(58) Field of Classification Search .......... 361/728–730, 361/752, 796, 800–803, 749, 807, 810, 679.01; 174/138 E, 138 G
See application file for complete search history.

(56) References Cited

U.S. PATENT DOCUMENTS

| 5,018,982 | A  | * | 5/1991  | Speraw et al. ............... 439/74 |
| 5,777,844 | A  | * | 7/1998  | Kiefer ........................ 361/704 |
| 6,183,285 | B1 | * | 2/2001  | Szu ............................ 439/327 |
| 6,366,465 | B1 | * | 4/2002  | Baur et al. ................... 361/752 |
| 6,468,114 | B1 | * | 10/2002 | Coret et al. ................. 439/752 |
| 6,591,088 | B1 | * | 7/2003  | Watanabe ................... 455/90.3 |
| 6,985,367 | B1 | * | 1/2006  | Scigiel ........................ 361/801 |
| 7,649,985 | B1 | * | 1/2010  | Fries et al. ............... 379/112.01 |
| 7,692,933 | B1 | * | 4/2010  | Mueller et al. ............ 361/804 |
| 8,000,111 | B2 | * | 8/2011  | Liao ............................ 361/807 |

FOREIGN PATENT DOCUMENTS

TW   M328040 U   3/2008

* cited by examiner

*Primary Examiner* — Hung S Bui
(74) *Attorney, Agent, or Firm* — Altis Law Group, Inc.

(57) ABSTRACT

A portable electronic device includes a housing, a cover, and a member positioned between the housing and the cover. The housing includes at least one hook. The cover is attached to the housing and includes at least one positioning pin. The member defines at least one locking hole. The hook passes through the locking hole to lock the member to the housing. The positioning pin is positioned adjacent to the hook to prevent the hook from disengaging from the locking hole.

4 Claims, 6 Drawing Sheets

FASTENING STRUCTURE FOR PORTABLE ELECTRONIC DEVICE

BACKGROUND

1. Technical Field

The exemplary disclosure generally relates to a fastening structure used in a portable electronic device.

2. Description of Related Art

In assembling electronic devices, many subsidiary pieces need to be secured to a main housing of the electronic device. A typical method uses screws to fasten the subsidiary piece to the main housing. However, because most of the subsidiary pieces are thin and usually made of plastic, and due to the fragile nature of plastic, it is difficult to maintain a tight engagement between the subsidiary pieces and the main housing with screws.

Therefore, there is room for improvement within the art.

BRIEF DESCRIPTION OF THE DRAWINGS

Many aspects of the fastening structure can be better understood with reference to the following drawings. The components in the drawings are not necessarily drawn to scale, the emphasis instead being placed upon clearly illustrating the principles of the fastening structure.

DETAILED DESCRIPTION

Figure 1:
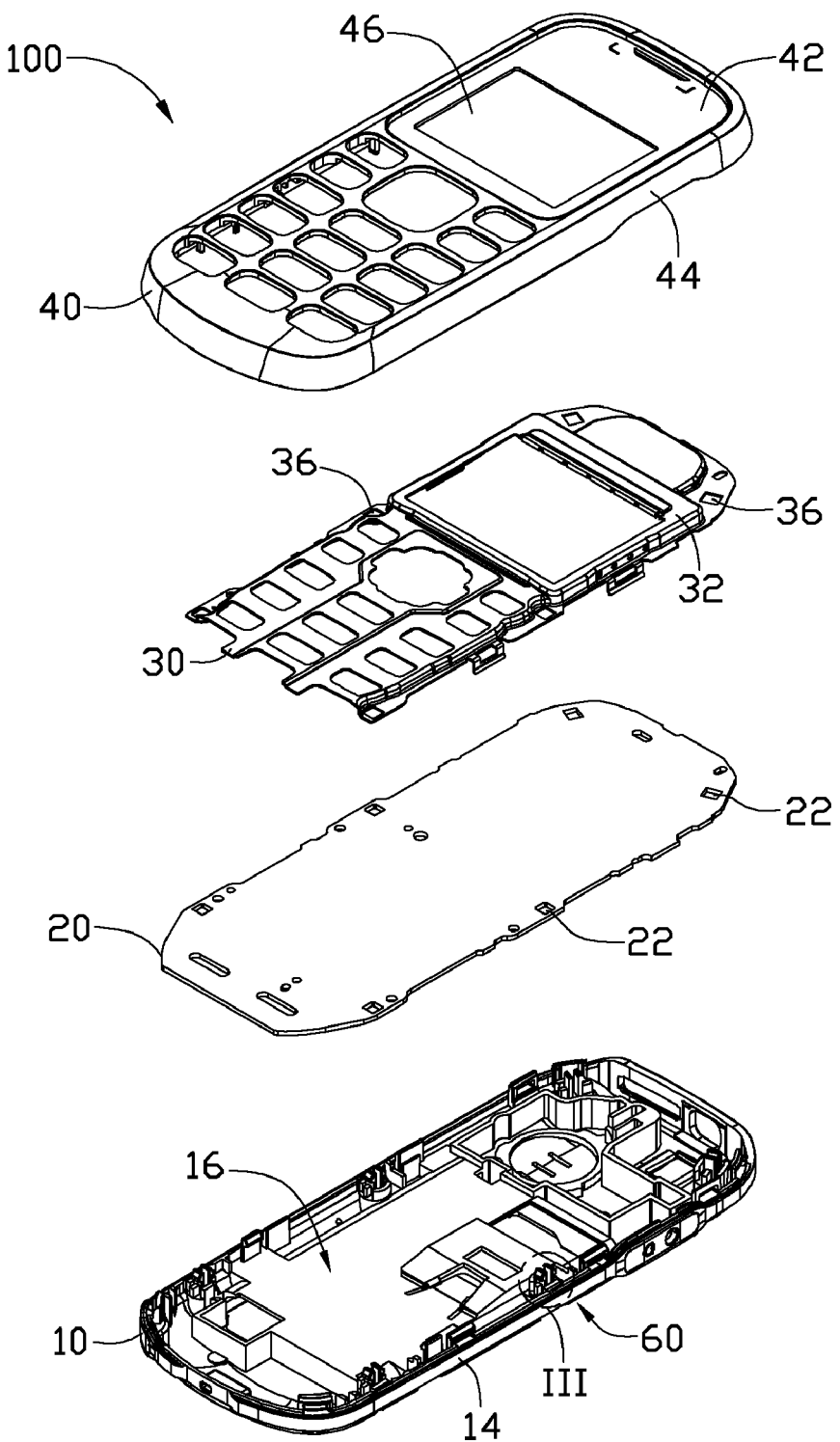
FIG. 1 is an exploded, isometric view of a portable electronic device with a fastening structure, in accordance with an exemplary embodiment.
Figure 2:
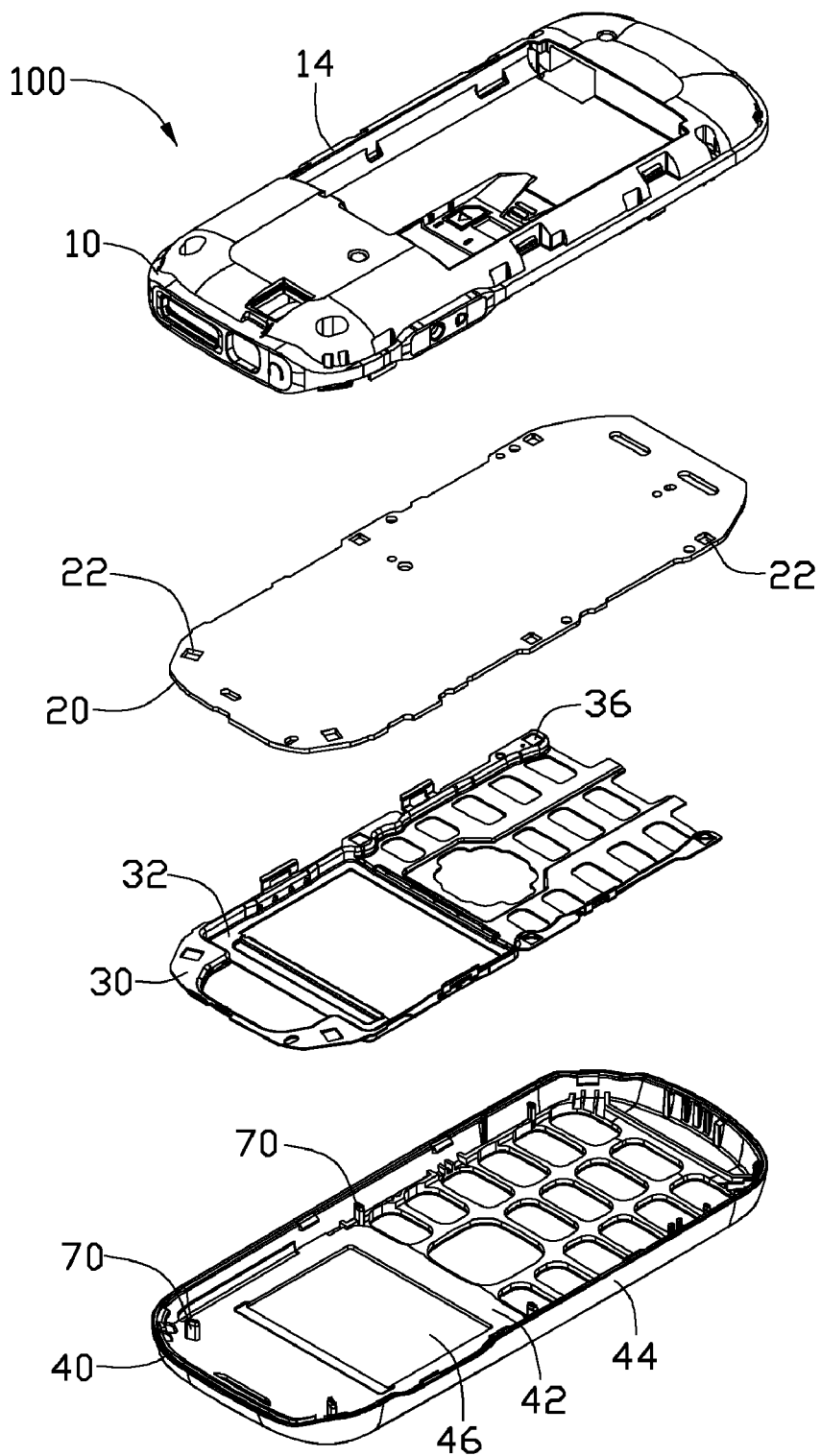
FIG. 2 is similar to FIG. 1, but shown from another aspect.
Figure 5:
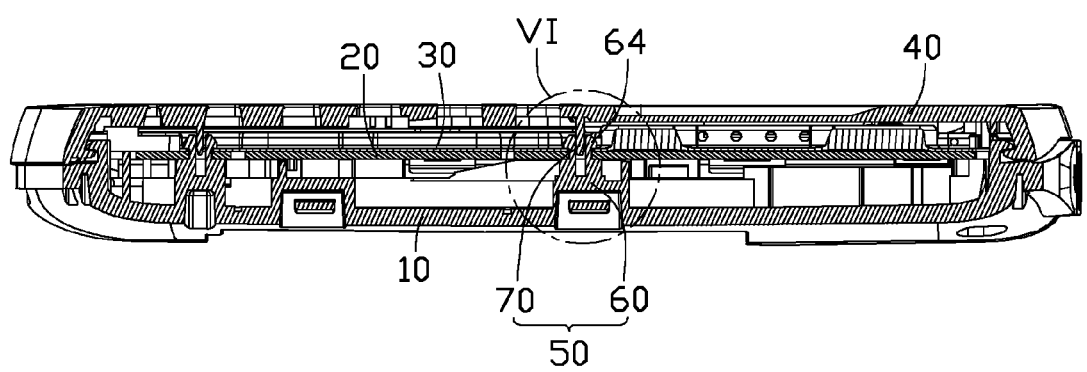
FIG. 5 is a cross section view taken along line V-V of FIG. 4.

FIGS. 1 and 2 show an exemplary embodiment of a portable electronic device 100 to illuminate a fastening structure 50 (shown in FIG. 5). The portable electronic device 100 includes a housing 10, a printed circuit board 20, a metal plate 30, and a cover 40. The fastening structure 50 includes a plurality of latching portions 60 and a plurality of positioning pins 70, wherein the latching portions 60 are formed on the housing 10 and the positioning pins 70 are formed on the cover 40.

Figure 3:
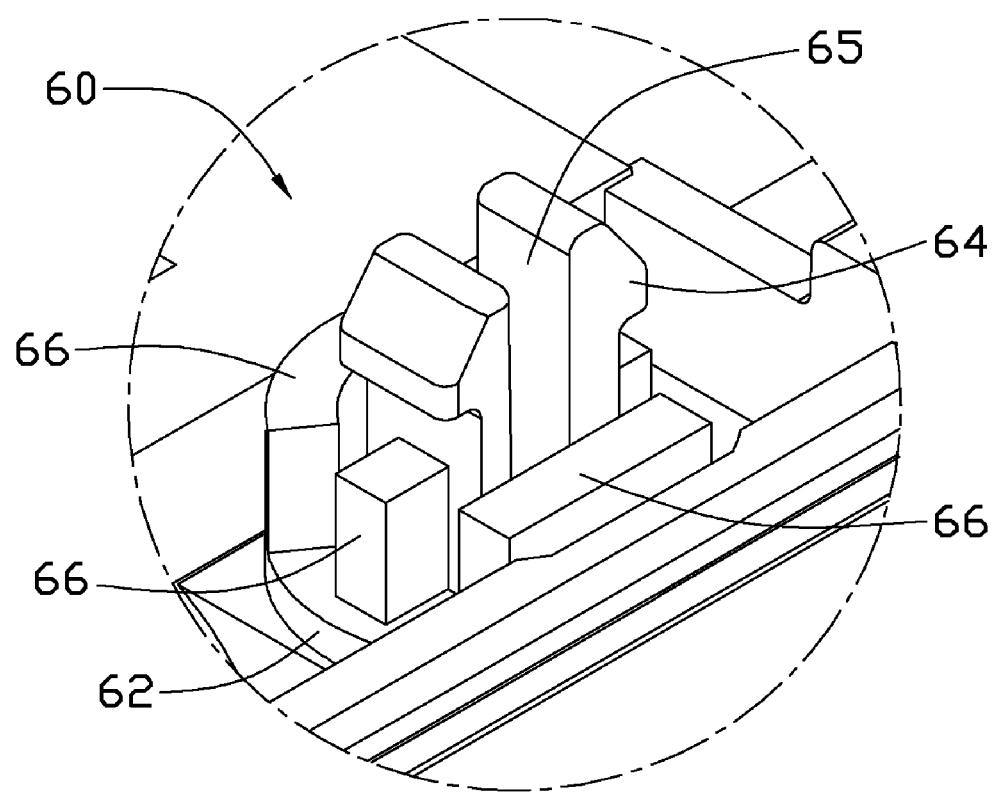
FIG. 3 is an enlarged view of a circled portion III of FIG. 1.
Figure 4:
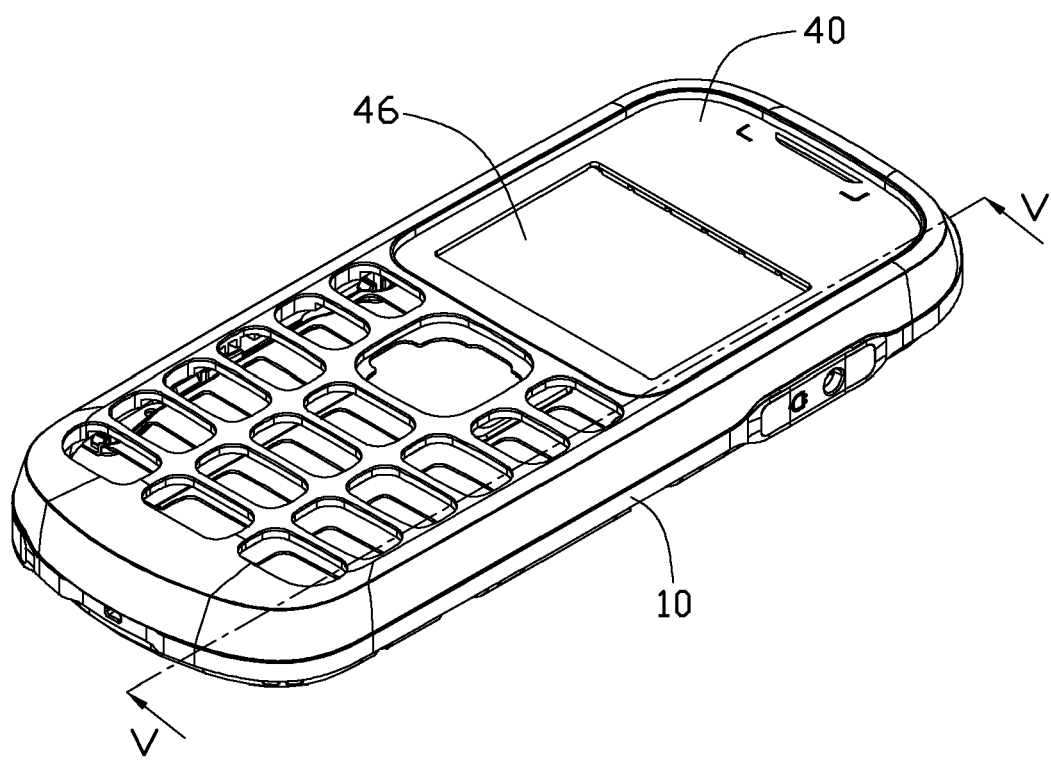
FIG. 4 is an assembled, isometric view of the portable electronic device.

The housing 10 includes a plurality of sidewalls 14 cooperatively defining a cavity 16 for receiving the printed circuit board 20. A plurality of spaced-apart latching portions 60 are formed along the sidewalls 14. Also referring to FIG. 3, each latching portion 60 includes a base 62, two hooks 64 formed on the base 62 and a plurality of resisting blocks 66 formed on the base 62 around the hooks 64. The two hooks 64 face opposite directions and have a space 65 therebetween. The resisting blocks 66 are lower than the hooks 64 to support the printed circuit board 20.

The printed circuit board 20 defines a plurality of locking holes 22 at edges thereof for the hooks 64 to extend through.

The metal plate 30 includes a frame 32 to support a display (not shown). A plurality of latching holes 36 is defined at the edges of the metal plate 30 for the hooks 64 to extend through.

The cover 40 includes a main plate 42 and a flange 44 around the main plate 42. The main plate 42 defines a window 46 corresponding to the frame 32. A plurality of positioning pins 70 are formed around the flange 44 corresponding to the latching portions 60.

Figure 6:
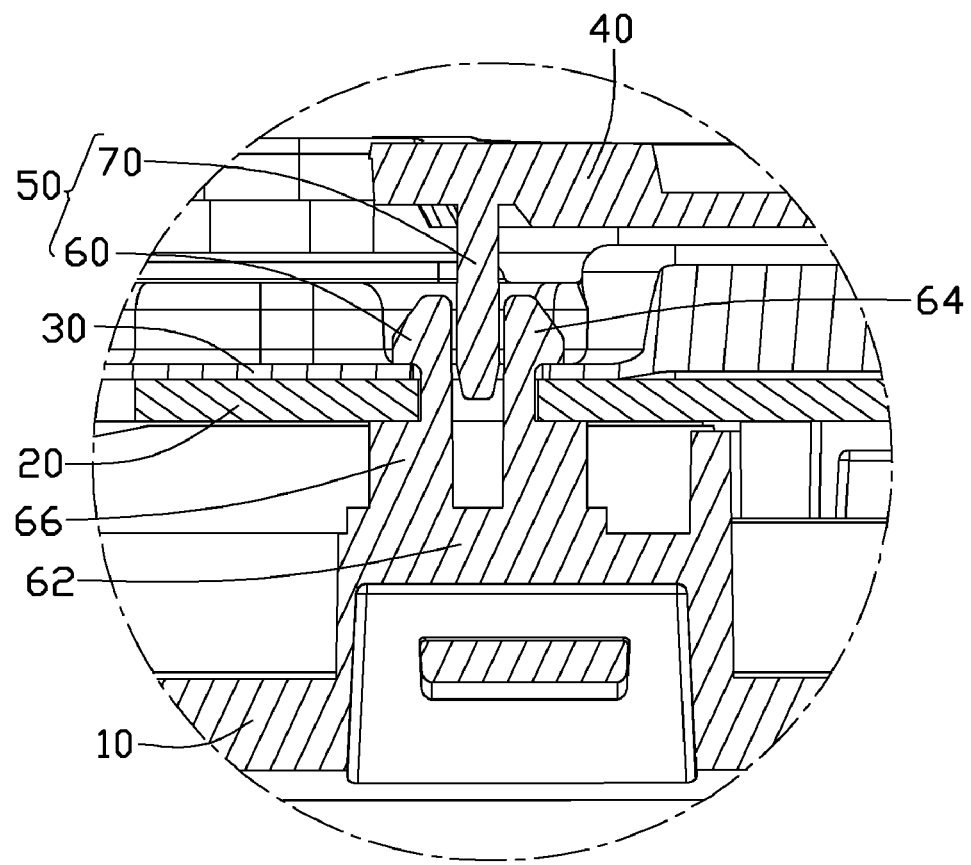
FIG. 6 is an enlarged view of a circled portion VI of FIG. 5.

To assemble the portable electronic device 100, also referring to FIG. 6, the printed circuit board 20 is attached to the housing 10. The two hooks 64 of each latching portion 60 are pressed by the printed circuit board 20 toward each other and then pass through a corresponding locking hole 22. The metal plate 30 is then attached to the printed circuit board 20. The two hooks 64 of each latching portion 60 are pressed by the metal plate 30 toward each other and then pass through a corresponding latching hole 36. When the hooks 64 rebound to their original positions, the metal plate 30 and the printed circuit board 20 are locked in place by the hooks 64. At last, the cover 40 is attached to the housing 10, and the positioning pins 70 are respectively inserted into the spaces 65 to prevent the hooks 64 from disengaging from the latching hole 36 and the locking hole 22. Thus, the metal plate 30 and the printed circuit board 20 are firmly attached to the housing 10 by the hooks 64.

It should be understood that the number of the hooks 64 of each latching portion 60 may be reduced to one. The positioning pins 70 are respectively positioned adjacent to the hooks 64 to prevent the hooks 64 from being easily deformed by an outside force.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable electronic device comprising:
a housing including a plurality of latching portions, each latching portion including a base, two spaced-apart hooks, and a plurality of resisting blocks, the hooks and the resisting blocks integrally formed on the base, and the resisting blocks being around the hooks, each hook including a hook end;
a cover attached to the housing and including a plurality of positioning pins; and
a metal plate and a printed circuit board positioned between the housing and the cover, the metal plate defining a plurality of latching holes, the printed circuit board defining a plurality of locking holes, the two hooks of each latching portion being pressed toward each other to pass through a corresponding locking hole and latching hole, the hooks rebounding to allow the hook ends to lock the metal plate and the printed circuit board to the housing, and each positioning pin positioned between the two hooks of a corresponding latching portion to prevent the hooks from disengaging from the locking holes and the latching holes.

2. The fastening structure as claimed in claim 1, wherein the housing comprises a plurality of sidewalls, and the latching portions are positioned along the sidewalls.

3. The fastening structure as claimed in claim 2, wherein the locking holes are positioned at edges of the member, and the latching holes are positioned at edges of the metal plate.

4. The fastening structure as claimed in claim 3, wherein the housing comprises a flange, and the positioning pins are positioned along the flange.

* * * * *

UNITED STATES PATENT AND TRADEMARK OFFICE
CERTIFICATE OF CORRECTION

PATENT NO. : 8,345,446 B2
APPLICATION NO. : 12/903311
DATED : January 1, 2013
INVENTOR(S) : Zhi-Hui Li et al.

Page 1 of 1

It is certified that error appears in the above-identified patent and that said Letters Patent is hereby corrected as shown below:

On the title page insert the following:

--(30) Foreign Application Priority Data
July 16, 2010  (CN) ......................2010 1 0228485--

Signed and Sealed this
Twenty-sixth Day of November, 2013

Margaret A. Focarino
*Commissioner for Patents of the United States Patent and Trademark Office*